(12) United States Patent
Suzuki

(10) Patent No.: US 12,535,668 B2
(45) Date of Patent: Jan. 27, 2026

(54) LASER SCANNING MICROSCOPE, IMAGE PROCESSING APPARATUS, AND METHOD OF OPERATING LASER SCANNING MICROSCOPE

(71) Applicant: Evident Corporation, Tatsuno-machi (JP)

(72) Inventor: Shingo Suzuki, Nagano (JP)

(73) Assignee: Evident Corporation, Nagano (JP)

( * ) Notice: Subject to any disclaimer, the term of this patent is extended or adjusted under 35 U.S.C. 154(b) by 339 days.

(21) Appl. No.: 18/202,720

(22) Filed: May 26, 2023

(65) Prior Publication Data
US 2023/0400674 A1 Dec. 14, 2023

(30) Foreign Application Priority Data

Jun. 13, 2022 (JP) .................................. 2022-095043

(51) Int. Cl.
*G02B 21/00* (2006.01)
(52) U.S. Cl.
CPC ....... *G02B 21/008* (2013.01); *G02B 21/0064* (2013.01); *G02B 21/0076* (2013.01); *G02B 21/0048* (2013.01)

(58) Field of Classification Search
CPC .............. G02B 21/008; G02B 21/0064; G02B 21/0076; G02B 21/0048
See application file for complete search history.

(56) References Cited

U.S. PATENT DOCUMENTS

| | | | |
|---|---|---|---|
| 2013/0015331 A1 | 1/2013 | Birk et al. | |
| 2015/0340390 A1* | 11/2015 | Wall | H10F 30/29 438/73 |
| 2020/0386616 A1 | 12/2020 | Birk et al. | |
| 2023/0022632 A1* | 1/2023 | Yang | A61B 3/10 |

FOREIGN PATENT DOCUMENTS

| | | |
|---|---|---|
| JP | 6420941 B2 | 10/2018 |
| JP | 2020531850 A | 11/2020 |

* cited by examiner

*Primary Examiner* — Matthew Mikels
(74) *Attorney, Agent, or Firm* — Holtz, Holtz & Volek PC

(57) ABSTRACT

A laser scanning microscope includes a scanner that scans a sample with laser light; a detector having a silicon photomultiplier (SiPM); and a processor that executes image processing of removing dark count noise based on an appearance frequency of the dark count noise in the SiPM on a scanned image.

16 Claims, 9 Drawing Sheets

| APPEARANCE FREQUENCY (TIMES/msec) | SiPM (A) | SiPM (B) | SiPM (C) | SiPM (D) |
|---|---|---|---|---|
| 5V | 4.00 | 3.94 | 5.53 | 5.60 |
| 8V | 6.23 | 6.40 | 7.77 | 7.85 |

T1

| 0°C | 5°C | 10°C | 15°C | 20°C |
|---|---|---|---|---|
| 1.00 | 1.13 | 1.68 | 4.39 | 9.74 |

T2

LASER SCANNING MICROSCOPE, IMAGE PROCESSING APPARATUS, AND METHOD OF OPERATING LASER SCANNING MICROSCOPE

CROSS REFERENCE TO RELATED APPLICATIONS

This application is based upon and claims the benefit of priority of the prior Japanese Patent Application No. 2022-095043, filed Jun. 13, 2022, the entire contents of which are incorporated herein by reference.

BACKGROUND OF THE INVENTION

Field of the Invention

The present disclosure relates to a laser scanning microscope, an image processing apparatus, and a method of operating a laser scanning microscope.

Description of the Related Art

In recent years, Silicon Photomultiplier (hereinafter, referred to as SiPM) has attracted attention as a detection element of a laser scanning microscope. A luminance value of an image acquired using the SiPM is a value obtained by multiplying the number of photons incident on the SiPM by a certain coefficient. Therefore, it is possible to quantitatively measure the number of photons from an image based on a proportional relationship between the number of photons and a luminance value, and it is expected that SiPM is often used as a photon counting device that counts the number of photons.

SUMMARY OF THE INVENTION

According to an aspect of the present invention, a laser scanning microscope includes a scanner that scans a sample with laser light; a detector having a silicon photomultiplier (SiPM); and a processor that executes image processing of removing dark count noise based on an appearance frequency of the dark count noise in the SiPM on a scanned image that is obtained by scanning the sample by the scanner and is generated based on a signal output from the detector.

According to an aspect of the present invention, an image processing apparatus includes a processor, in which the processor executes image processing of removing dark count noise based on an appearance frequency of the dark count noise in a silicon photomultiplier (SiPM) included in a laser scanning microscope on a scanned image that is obtained by scanning a sample by a scanner in the laser scanning microscope and is generated based on a signal output from a detector having the SiPM.

According to an aspect of the present invention, an operation method is a method of operating a laser scanning microscope including: generating a scanned image that is obtained by scanning a sample by a scanner included in the laser scanning microscope based on a signal output from a detector having a silicon photomultiplier (SiPM) included in the laser scanning microscope; and executing image processing of removing dark count noise based on an appearance frequency of the dark count noise in the SiPM on the scanned image.

DESCRIPTION OF THE EMBODIMENTS

When the SiPM is used, there is a problem that dark count noise is generated. The dark count noise generated in the SiPM is randomly generated and is output as a signal of an integer number of photons. Due to this characteristic, the dark count noise is not easy to distinguish from a signal output by detecting photons and may cause erroneous counting of the number of photons. A technique pertaining to such a technical problem is disclosed in JP 6420941 B, for example.

According to the technology described in JP 6420941 B, the influence of dark count noise can be reduced by activating only pixels on which light is incident. However, the influence of the dark count noise generated in an activated pixel cannot be avoided.

First Embodiment

Figure 1:
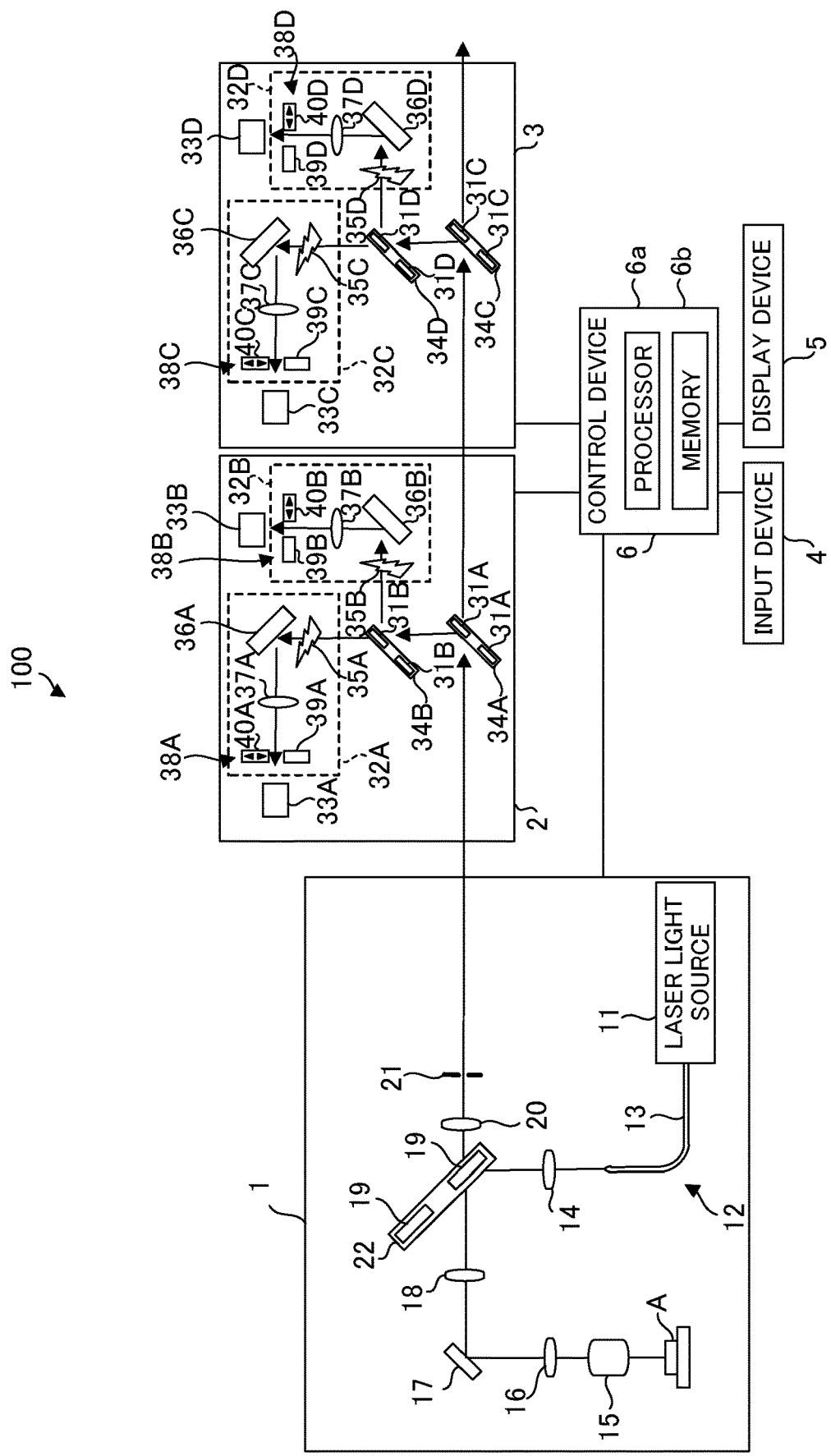
FIG. 1 is a diagram illustrating a configuration of a laser scanning microscope according to a first embodiment.

FIG. 1 is a diagram illustrating a configuration of a laser scanning microscope according to the present embodiment. A fluorescence microscope 100 is an example of the laser scanning microscope and includes a scanner that scans a sample with laser light, a detector having an SiPM, and a control device that generates an image of the sample scanned by the scanner (hereinafter, referred to as a scanned image) based on a signal output from the detector. Hereinafter, with reference to FIG. 1, a configuration of the fluorescence microscope 100 is described in detail.

As illustrated in FIG. 1, the fluorescence microscope 100 includes a scan unit 1 that two-dimensionally scans a sample A with laser light and a first detection unit 2 and a second detection unit 3 that detect fluorescence generated in the sample A by being irradiated with the laser light and is incident via the scan unit 1.

The scan unit 1 includes a laser light source 11 that emits laser light and an illumination optical system 12 that guides the laser light from the laser light source 11 to the sample A. The laser light source 11 includes a plurality of types of laser light sources having different oscillation wavelengths such as 405 nm, 488 nm, and 543 nm and includes an acousto-optics tunable filter (AOTF) that can control emission of laser light having each oscillation wavelength. The illumination optical system 12 includes an optical fiber 13 that guides laser light from the laser light source 11 and a collimator lens 14.

In addition, the scan unit 1 includes an objective lens 15 that condenses fluorescence from the sample A, an imaging lens 16 that images the fluorescence condensed by the objective lens 15, a scanner 17 that scans the sample A with laser light, a pupil projection lens 18 that makes the fluorescence imaged by the imaging lens 16 substantially parallel light, an excitation dichroic mirror 19 that branches the fluorescence made substantially parallel light from an optical path of the laser light, a confocal lens 20 that condenses the branched fluorescence, and a confocal pinhole 21 that causes only fluorescence generated from a focal position of the objective lens 15 to pass through among the condensed fluorescence.

The scanner 17 includes, for example, two galvano mirrors that scan the sample A in directions orthogonal to each other. Note that the scanner may include other scanning devices such as a resonant mirror instead of or in addition to the galvano mirror.

The plurality of excitation dichroic mirrors 19 having different spectral transmittances or reflectances are fixed to a rotatable excitation turret 22. The rotation of the excitation turret 22 can change the excitation dichroic mirror 19 inserted into the optical path.

The first detection unit 2 includes two photometric dichroic mirrors 31A and 31B that decompose (spectrally disperse) fluorescence incident from the scan unit 1 (fluorescence passing through the confocal pinhole 21) into two optical paths according to a wavelength region, a wavelength selection mechanism 32A that selects a wavelength of light detected from fluorescence of one optical path decomposed by the photometric dichroic mirror 31B, a photodetector 33A that detects light of a wavelength selected by the wavelength selection mechanism 32A, a wavelength selection mechanism 32B that selects a wavelength of light detected from fluorescence of the other optical path decomposed by the photometric dichroic mirror 31B, and a photodetector 33B that detects light of a wavelength selected by the wavelength selection mechanism 32B.

The plurality of photometric dichroic mirrors 31A and 31B having different spectral transmittances or reflectances are fixed to rotatable photometric turrets 34A and 34B, respectively. The rotation of the photometric turrets 34A and 34B can change the photometric dichroic mirrors 31A and 31B inserted into the optical path.

The photometric dichroic mirror 31A transmits the fluorescence from the scan unit 1 toward the second detection unit 3 or reflects the fluorescence toward the photometric dichroic mirror 31B according to the wavelength range. The photometric dichroic mirror 31B transmits the fluorescence from the photometric dichroic mirror 31A toward the wavelength selection mechanism 32A or reflects the fluorescence toward the wavelength selection mechanism 32B according to the wavelength range.

The wavelength selection mechanism 32A includes a diffraction grating (volume phase holographic (VPH)) 35A that spectrally disperses fluorescence into spectral components, a swing mirror 36A that reflects fluorescence spectrally dispersed by the diffraction grating 35A, an imaging lens 37A that condenses the fluorescence reflected by the swing mirror 36A onto a light receiving surface of the photodetector 33A, and a slit (light-shielding slit) 38A that partially blocks the fluorescence condensed by the imaging lens 37A.

The diffraction grating 35A spectrally disperses the spectral component of the fluorescence transmitted through the photometric dichroic mirror 31B in one direction. The swing mirror 36A is provided to be swingable about a swing axis orthogonal to the arrangement direction of the spectrum array spectrally dispersed by the diffraction grating 35A. The swing mirror 36A can change a spectral component passing through the slit 38A according to a swing angle.

The slit 38A includes a fixed member 39A and a movable member 40A arranged with a gap in the arrangement direction of the spectrum array with respect to the fixed member 39A. The movable member 40A is movably provided in the arrangement direction of the spectrum array with respect to the fixed member 39A and can widen or narrow the gap with the fixed member 39A, that is, an opening through which the fluorescence passes. The photodetector 33A has a wavelength sensitivity characteristic different from those of photodetectors 33C and 33D described below and has, for example, a wavelength sensitivity characteristic higher in sensitivity on the short wavelength side than the photodetectors 33C and 33D.

The wavelength selection mechanism 32B has the same configuration as the wavelength selection mechanism 32A. That is, the wavelength selection mechanism 32B includes a diffraction grating (VPH) 35B, a swing mirror 36B, an imaging lens 37B, and a slit (light-shielding slit) 38B.

The diffraction grating 35B spectrally disperses the spectral component of the fluorescence reflected by the photometric dichroic mirror 31B in one direction. The swing mirror 36B is provided so as to be swingable about a swing axis orthogonal to the arrangement direction of the spectrum array spectrally dispersed by the diffraction grating 35B and can change a spectral component passing through the slit 38B according to a swing angle. The slit 38B includes a fixed member 39B and a movable member 40B. The photodetector 33B has the same wavelength sensitivity characteristic as that of the photodetector 33A.

The second detection unit 3 has the same configuration as the first detection unit 2. That is, the second detection unit 3 includes two photometric dichroic mirrors 31C and 31D, a wavelength selection mechanism 32C, the photodetector 33C, a wavelength selection mechanism 32D, and the photodetector 33D.

Similarly to the photometric dichroic mirrors 31A and 31B, the plurality of photometric dichroic mirrors 31C and 31D having different spectral transmittances or reflectances are fixed to rotatable photometric turrets 34C and 34D, respectively. The rotation of the photometric turrets 34C and 34D can change the photometric dichroic mirrors 31C and 31D inserted into the optical path.

The photometric dichroic mirror 31C transmits the fluorescence from the photometric dichroic mirror 31A of the first detection unit 2 or reflects the fluorescence toward the photometric dichroic mirror 31D according to the wavelength range. The photometric dichroic mirror 31D transmits the fluorescence from the photometric dichroic mirror 31C toward the wavelength selection mechanism 32C or reflects the fluorescence toward the wavelength selection mechanism 32D according to the wavelength range.

The wavelength selection mechanism 32C selects the wavelength of the light to be detected from the fluorescence having passed through the photometric dichroic mirror 31D. This wavelength selection mechanism 32C includes a diffraction grating (VPH) 35C, a swing mirror 36C, an imaging lens 37C, and a slit (light-shielding slit) 38C.

The diffraction grating 35C spectrally disperses the spectral component of the fluorescence from the photometric dichroic mirror 31D in one direction. The swing mirror 36C is provided so as to be swingable about a swing axis orthogonal to the arrangement direction of the spectrum array spectrally dispersed by the diffraction grating 35C and can change a spectral component passing through the slit 38C according to a swing angle.

The slit 38C includes a fixed member 39C and a movable member 40C. The photodetector 33C detects light having a wavelength selected by the wavelength selection mechanism 32C. This photodetector 33C has a wavelength sensitivity characteristic different from those of the photodetectors 33A and 33B and has, for example, a wavelength sensitivity characteristic higher in sensitivity on the long wavelength side than the photodetectors 33A and 33B.

The wavelength selection mechanism 32D selects the wavelength of the light to be detected from the fluorescence reflected from the photometric dichroic mirror 31D. This wavelength selection mechanism 32D includes a diffraction grating (VPH) 35D, a swing mirror 36D, an imaging lens 37D, and a slit (light-shielding slit) 38D.

The diffraction grating 35D spectrally disperses the spectral component of the fluorescence from the photometric dichroic mirror 31D in one direction. The swing mirror 36D is provided so as to be swingable about a swing axis orthogonal to the arrangement direction of the spectrum array spectrally dispersed by the diffraction grating 35D and can change a spectral component passing through the slit 38D according to a swing angle.

The slit 38D includes a fixed member 39D and a movable member 40D. The photodetector 33D detects light having a wavelength selected by the wavelength selection mechanism 32D. This photodetector 33D has the same wavelength sensitivity characteristic as that of the photodetector 33C.

SiPMs are used for the detection elements of the photodetectors 33A, 33B, 33C, and 33D, and the SiPMs are thermostatic by Peltier elements. That is, the photodetectors 33A, 33B, 33C, and 33D each include an SiPM and a Peltier element as a cooling mechanism. The SiPM includes a multi-pixel avalanche photodiode (APD) and operates in Geiger mode to output a signal having sensitivity to one photon and intensity proportional to the number of photons.

The SiPMs included in the photodetectors 33A and 33B are SiPMs different in types from the SiPMs included in the photodetectors 33C and 33D. These differences in types causes a difference in sensitivity characteristics between the photodetectors 33A and 33B and the photodetectors 33C and 33D. Note that, hereinafter, when the photodetectors 33A, 33B, 33C, and 33D are not particularly distinguished, each of the photodetectors or the photodetectors are collectively referred to as the photodetector 33.

The fluorescence microscope 100 further includes an input device 4, a display device 5, and a control device 6. According to an input operation of the user, the input device 4 inputs various settings of the fluorescence microscope 100, for example, inputs of a fluorescent dye or a wavelength range to be observed, inputs of settings of the photodetector 33 (SiPM) used for image acquisition, and inputs of scan settings. The input device 4 includes, for example, a keyboard, a mouse, and a touch panel.

The display device 5 performs various displays such as display of a setting input screen that enables input of settings of the fluorescence microscope 100 and display of an image. The display device 5 is, for example, a liquid crystal display (LCD).

The control device 6 controls each unit of the fluorescence microscope 100. For example, the control device 6 controls the fluorescence microscope 100 such that the scanner 17 scans the sample A with the laser light and detects the fluorescence from the sample A according to the setting of the fluorescence microscope 100. Further, the control device 6 generates a scanned image of the sample A based on the signal output from the photodetector 33 of the fluorescence microscope 100. More specifically, the scanned image is constructed based on the signal related to the fluorescence intensity output from the photodetector 33 and the signal related to the scanning position of the scanner 17.

The control device 6 is, for example, a personal computer (PC) and includes a processor 6a and a memory 6b. Various types of control performed by the control device 6 may be implemented by, for example, the processor 6a executing a program stored in the memory 6b (so-called software processing), may be implemented by hardware processing, or may be implemented by a combination of software processing and hardware processing. The processor 6a includes, for example, one or more integrated circuits. The integrated circuit may be, for example, a central processing unit (CPU), a graphics processing unit (GPU), a digital signal processor (DSP), an application specific integrated circuit (ASIC), or a field-programmable gate array (FPGA).

The memory 6b stores a program executed by the processor 6a. The memory 6b includes a non-transitory computer readable medium storing a program executed by the processor 6a. The memory 6b can include, for example, one or more optional semiconductor memories and one or more other storage devices. The semiconductor memories include, for example, a volatile memory such as a random access memory (RAM), and a nonvolatile memory such as a read only memory (ROM), a programmable ROM, and a flash memory. The RAM may include, for example, a dynamic random access memory (DRAM), a static random access memory (SRAM), and the like. The other storage device may include, for example, a magnetic storage device including, for example, a magnetic disk as a computer-readable medium, an optical storage device including, for example, an optical disk as a computer-readable medium, and the like.

In the fluorescence microscope 100 configured as described above, since the SiPM is used as the photodetector, the scanned image generated by the control device 6 includes randomly generated noise called dark count noise. Therefore, in the fluorescence microscope 100, the control device 6 executes image processing for removing dark count noise generated in the SiPM on the generated scanned image. More specifically, the control device 6 executes image processing of removing the dark count noise on the scanned image based on the appearance frequency of the dark count noise in the SiPM. That is, the control device 6 is an example of the image processing apparatus that executes image processing for removing the dark count noise. By executing image processing using such statistical information of the appearance frequency, dark count noise can be removed more satisfactorily than image processing for typical noise removal performed in the related art.

Figure 2:
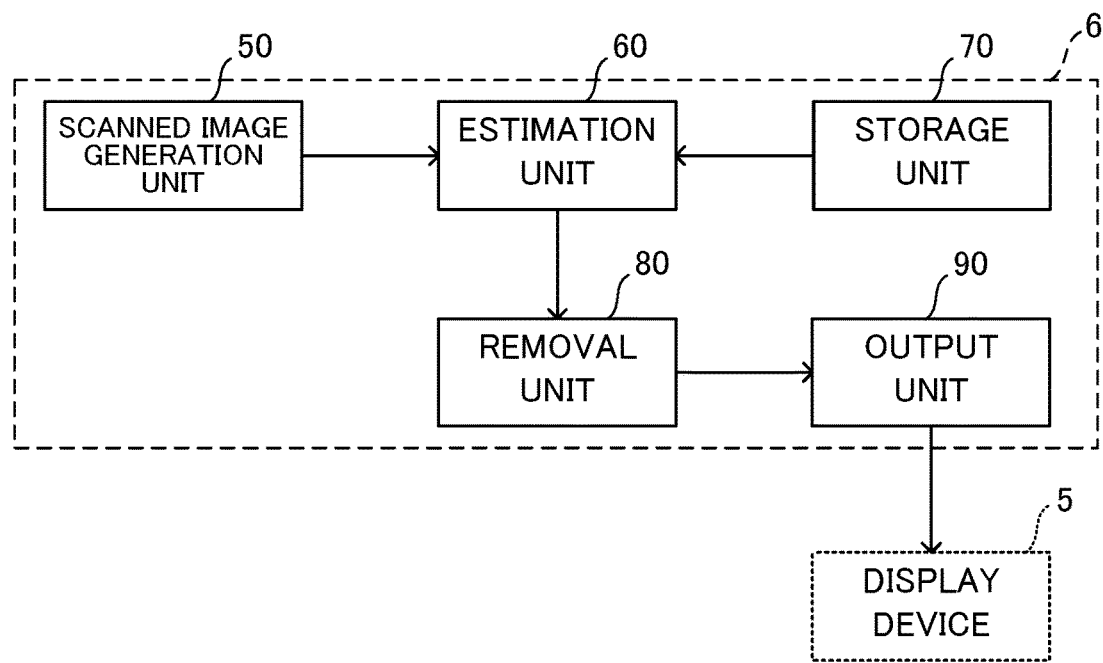
FIG. 2 is a diagram illustrating a functional configuration of a control device illustrated in FIG. 1.
Figure 3:
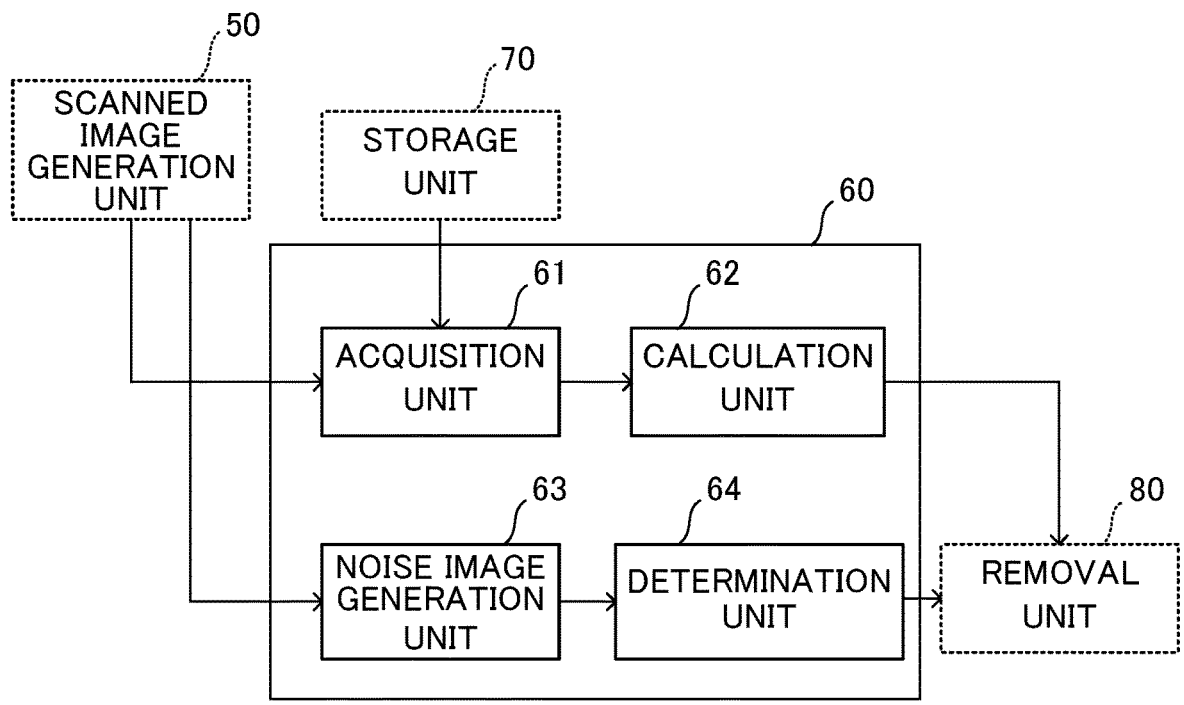
FIG. 3 is a diagram illustrating a more detailed configuration of an estimation unit illustrated in FIG. 2.

FIG. 2 is a diagram illustrating a functional configuration of the control device illustrated in FIG. 1 and mainly illustrates a configuration related to the above-described image processing. FIG. 3 is a diagram illustrating a more detailed configuration of an estimation unit illustrated in FIG. 2; Hereinafter, a configuration related to image processing executed by the control device 6 as a countermeasure against dark count noise is described with reference to FIGS. 2 and 3.

As illustrated in FIG. 2, the control device 6 includes a scanned image generation unit an estimation unit 60, a storage unit 70, a removal unit 80, and an output unit 90. Furthermore, as illustrated in FIG. 3, the estimation unit 60 includes an acquisition unit 61, a calculation unit 62, a noise image generation unit 63, and a determination unit 64. Among these functional configurations, the scanned image generation unit 50, the estimation unit 60, the removal unit 80, and the output unit 90 are implemented, for example, by the processor 6a executing a program stored in the memory 6b, and the storage unit 70 is implemented, for example, by the memory 6b.

The scanned image generation unit 50 generates a scanned image of the sample A. The estimation unit 60 estimates the amount of dark count noise (hereinafter, simply referred to as a noise amount) included in the scanned image generated by the scanned image generation unit 50. The removal unit 80 removes the dark count noise from the scanned image according to the noise amount estimated by the estimation unit 60. The output unit 90 outputs a corrected image generated by the above image processing to the display device 5.

Specifically, the estimation unit 60 estimates the noise amount based on the appearance frequency of the dark count noise in the SiPM and the setting of the fluorescence microscope 100. The estimation unit 60 calculates the photometric time for each one of the scanned images from the setting of the fluorescence microscope 100 and estimates the noise amount by a combination of the appearance frequency and the calculated photometric time. Note that the photometric time for each one of the scanned images refers to time during which photometry is actually performed, that is, a period of time during which dark count noise can be generated, among scanning times from the start of scanning to the end of scanning for acquiring an image. The scanning time also includes a period of time in which the scanner over-swings with respect to the scanning area in which the image is acquired or moves to the next line, but during these periods of time, photometry is not performed, and a signal is not detected, so the dark count noise is not detected. The photometric time for each one of the scanned images corresponds to time obtained by subtracting time corresponding to this period of time in which the dark count noise is not detected from the scanning time and is the total time of the photometric time of all the pixels configuring the image. Furthermore, the setting of the fluorescence microscope 100 includes settings of SiPM (for example, a setting related to an applied voltage and a thermostatic temperature) and scan settings of the fluorescence microscope 100 (for example, a scan speed, a scan size, the number of times of scanning per image, and the like).

More specifically, in the estimation unit 60, the acquisition unit 61 and the calculation unit 62 estimate the noise amount. The acquisition unit 61 acquires information on the appearance frequency of the dark count noise (hereinafter, simply the frequency information) in the SiPM based on the setting of the SiPM included in the setting of the fluorescence microscope 100. This is because the appearance frequency in the SiPM can vary depending on the setting of the SiPM.

Note that the frequency information may be stored in the storage unit 70, and the acquisition unit 61 may acquire the frequency information from the storage unit 70. The storage unit 70 stores frequency information for each SiPM setting. For example, the storage unit 70 may store the frequency information for each setting related to the applied voltage to the SiPM or may store the frequency information for each setting related to the temperature at which the SiPM is thermostatic.

In addition, the storage unit 70 may store the frequency information for each individual of the SiPMs included in the photodetector 33 or may store the frequency information for each type of SiPM included in the photodetector 33. Similarly to the setting of the SiPM, this is because the appearance frequency of the SiPM can vary per individual or type. Therefore, the acquisition unit 61 may acquire frequency information corresponding to the individual or type of the SiPMs used to generate the scanned image.

When the acquisition unit 61 acquires the frequency information, the calculation unit 62 statistically calculates the noise amount based on the appearance frequency of the dark count noise specified from the frequency information and the scan setting included in the setting of the fluorescence microscope 100. Specifically, the calculation unit 62 calculates, as the noise amount, the number of times of the appearance of dark count noise for each one of the scanned images (that is, the number of pixels including dark count noise) from the total time of the photometric time in all the pixels configuring the image, which is the photometric time specified from the appearance frequency and the scan setting.

Note that the calculation unit 62 may specify the appearance frequency of the dark count noise for each intensity of the dark count noise from the frequency information acquired by the acquisition unit 61. That is, the calculation unit 62 may specify the appearance frequencies of the dark count noise erroneously detected as one photon, the dark count noise erroneously detected as two photons, . . . , and the dark count noise erroneously detected as N photons. In that case, the calculation unit 62 may calculate the noise amount for each intensity of the dark count noise.

When the estimation unit 60 calculates the noise amount as the number of pixels, the removal unit 80 subtracts a predetermined value from the pixel values of the number of pixels calculated as the noise amount by the calculation unit 62. Here, the predetermined value may correspond to the signal intensity output from the SiPM by detecting photons.

When the calculation unit 62 calculates the noise amount for each intensity, the removal unit 80 subtracts a value corresponding to the intensity from the pixel values of the number of pixels calculated as the noise amount by the calculation unit 62 for each intensity. Here, the value corresponding to the intensity may be proportional to the number of photons.

As described above, in the fluorescence microscope 100, the control device 6 estimates the noise amount by using the appearance frequency and the setting of the fluorescence microscope 100 and thus can accurately estimate the amount of dark count noise, so the dark count noise can be removed without excess or deficiency. Furthermore, the control device 6 calculates the noise amount as the number of pixels and adjusts the pixel value by a value corresponding to detection of photons for the calculated number of pixels. As a result, dark count noise can be removed from the scanned image without losing the characteristics of the image obtained using SiPM in which the pixel value is proportional to the number of incident photons. Therefore, with the fluorescence microscope 100, a favorable corrected image in which dark count noise is suppressed can be obtained, and photons can be more accurately counted.

The estimation unit 60 may estimate the appearance position of the dark count noise in addition to the noise amount. Specifically, the estimation unit 60 may estimate the appearance position of the dark count noise based on the estimated noise amount, and the removal unit 80 may remove the dark count noise from the appearance position on the scanned image estimated by the estimation unit 60 by the noise amount estimated by the estimation unit 60.

More specifically, in the estimation unit 60, the noise image generation unit 63 and the determination unit 64 estimate the appearance positions. The noise image generation unit 63 calculates a score related to the dark count noise included in each pixel of the scanned image based on the scanned image and generates a noise image including the score. The noise image is used to specify a position where generation of dark count noise is suspected (candidate position). The score related to the dark count noise may be correlated with the dark count noise. Specifically, the score may be correlated with the intensity of the dark count noise or may be correlated with the generation probability of the dark count noise. This is because the candidate positions can be specified in both cases.

When the noise image generation unit 63 generates the noise image, the determination unit 64 determines the appearance position of the dark count noise based on the noise image and the estimated noise amount. Specifically, based on the score of the noise image, the determination unit 64 determines candidate positions as appearance positions in order from the most likely candidate positions by the noise amount.

As described above, in the fluorescence microscope 100, the control device 6 specifies the appearance position of the dark count noise in units of pixels and adjusts the pixel value from each specified pixel by the value corresponding to the detection of the photon. As a result, it is possible to satisfactorily remove dark count noise randomly generated in both the spatial direction and the time direction. Therefore, with the fluorescence microscope 100, a favorable corrected image in which dark count noise is suppressed can be obtained, and photons can be more accurately counted.

Figure 4:
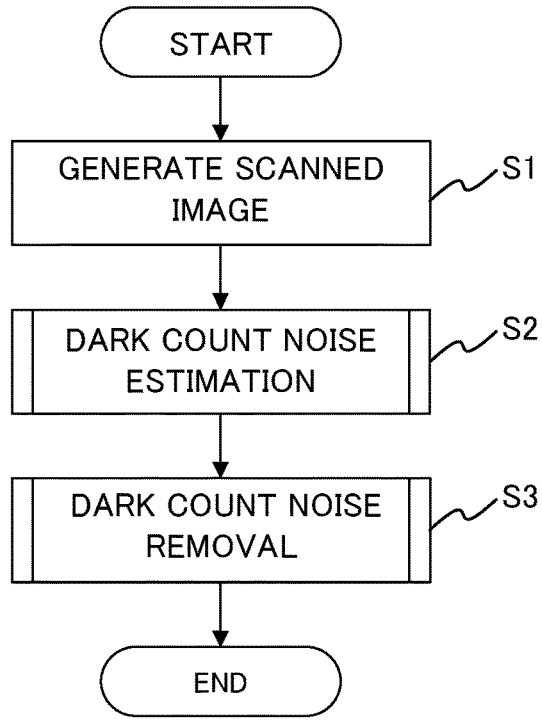
FIG. 4 is an example of a flowchart of processing executed by the laser scanning microscope according to the first embodiment.
Figure 5:
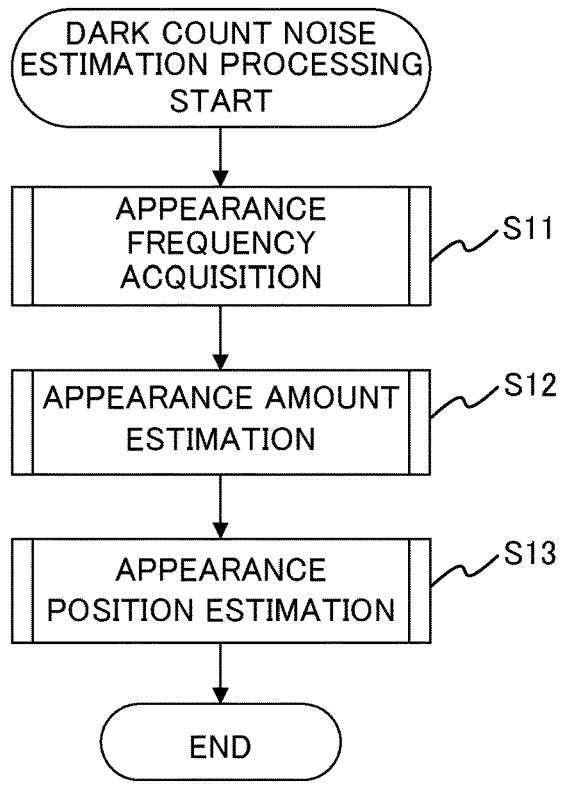
FIG. 5 is an example of a flowchart of dark count noise estimation processing.
Figure 6:
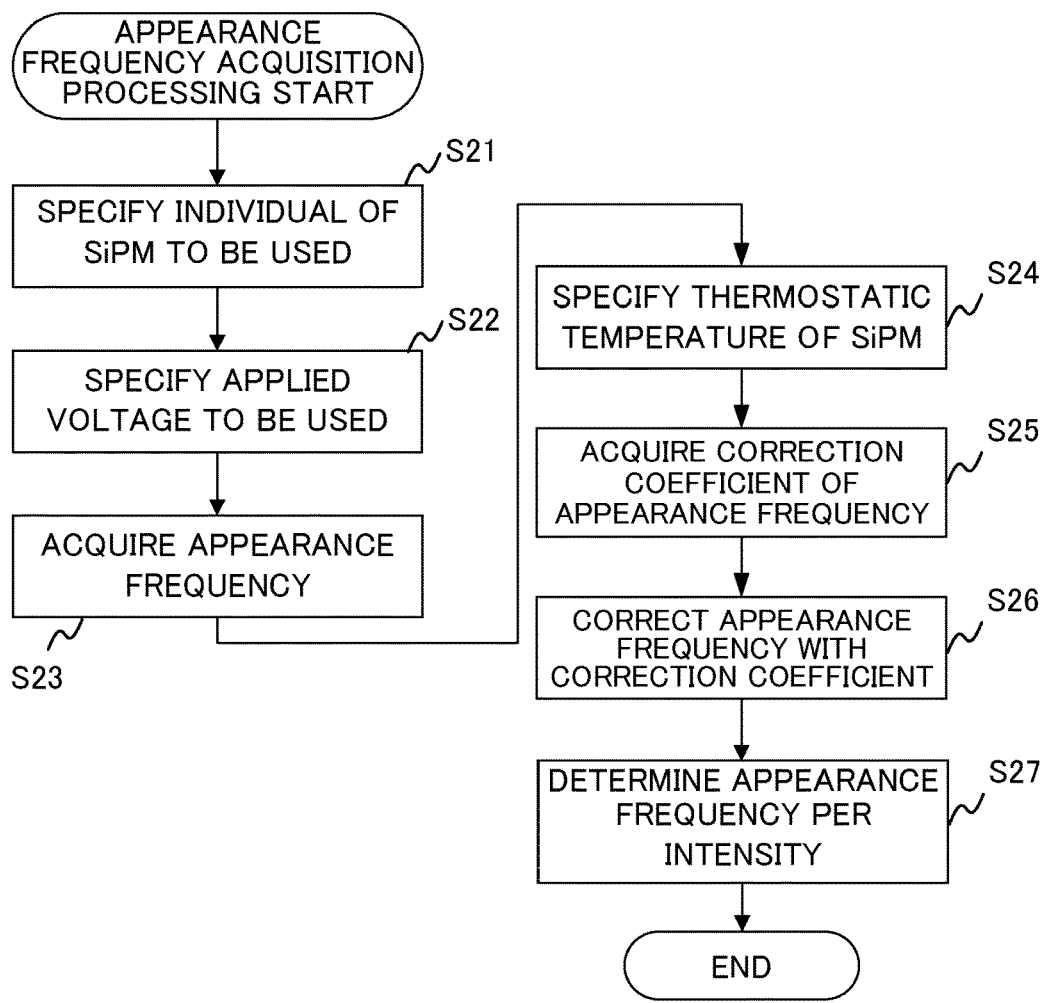
FIG. 6 is an example of a flowchart of appearance frequency acquisition processing.
Figure 7:
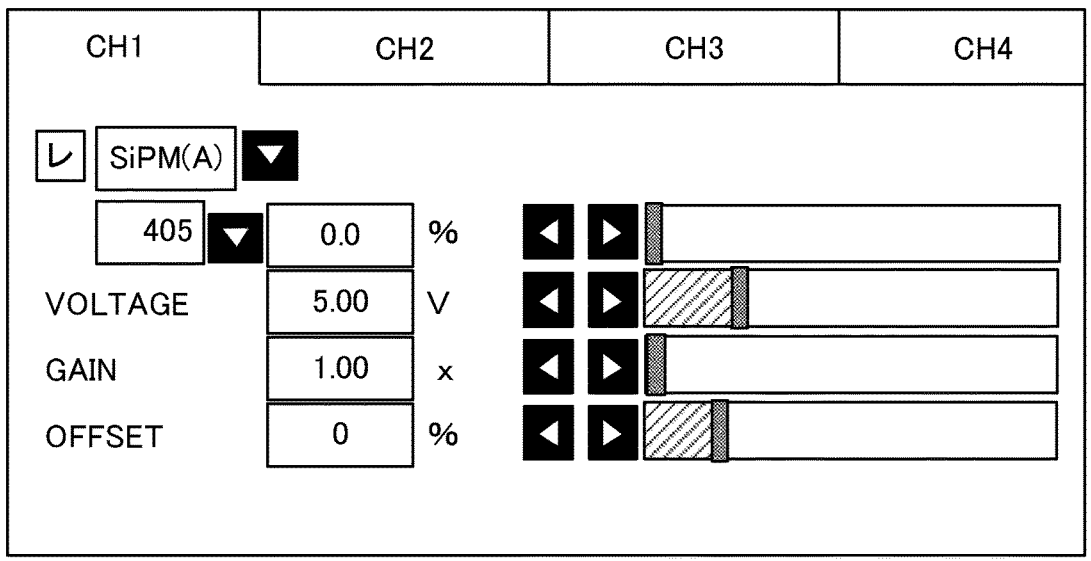
FIG. 7 is a screen example related to SiPM setting.
Figures 8, 9, 10:
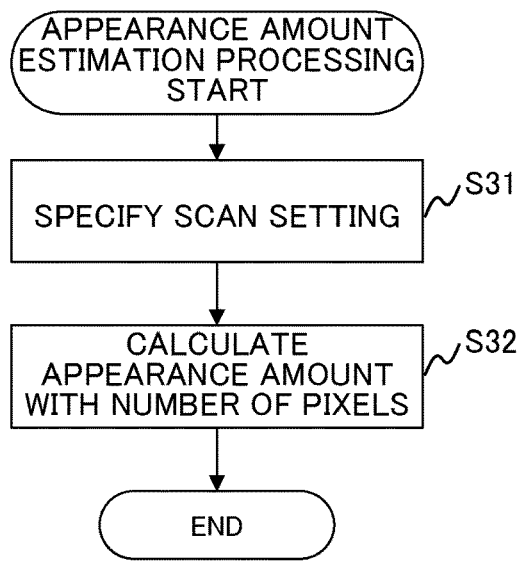
FIG. 8 is an example of a table including information regarding an appearance frequency of a dark count noise.
FIG. 9 is another example of a table including information regarding an appearance frequency of a dark count noise.
FIG. 10 is an example of a flowchart of appearance amount estimation processing.
Figures 11, 12:
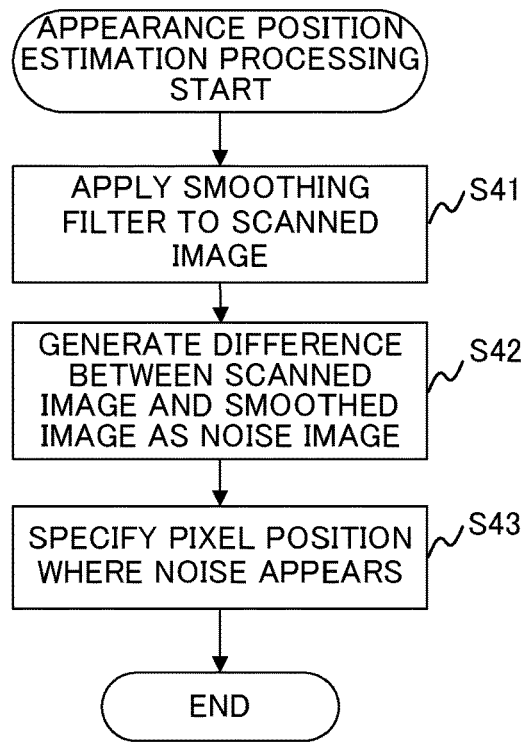
FIG. 11 is a screen example related to scan setting.
FIG. 12 is an example of a flowchart of appearance position estimation processing.
Figure 13:
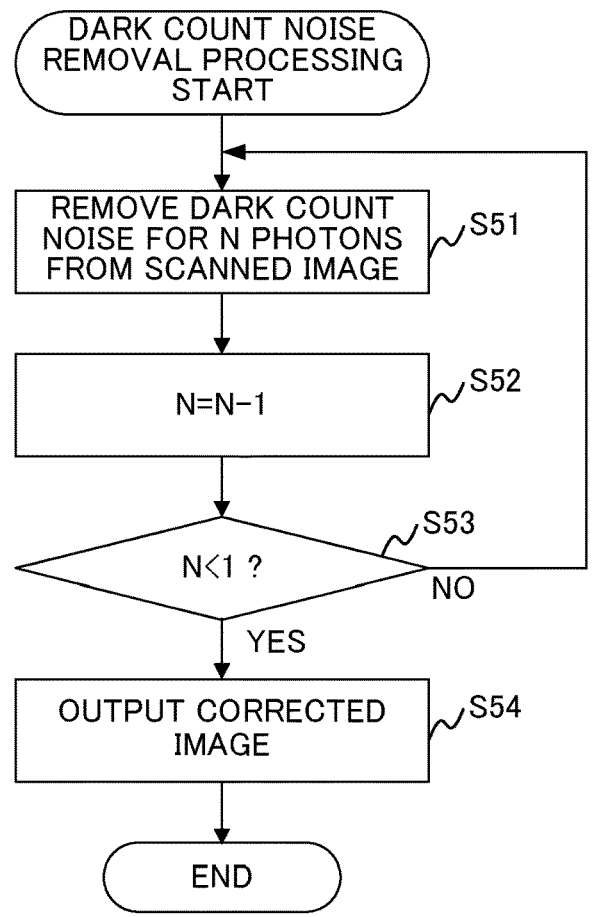
FIG. 13 is an example of a flowchart of dark count noise removal processing.
Figure 14:
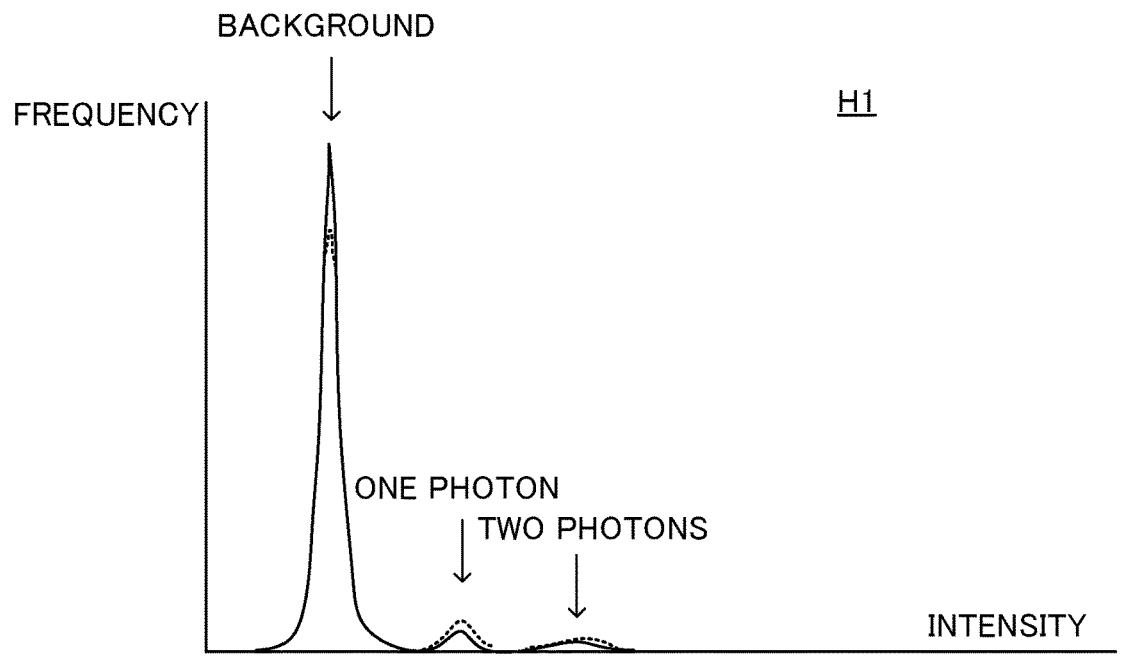
FIG. 14 is a diagram illustrating a comparison between histograms of a scanned image and a corrected image.
Figure 15:
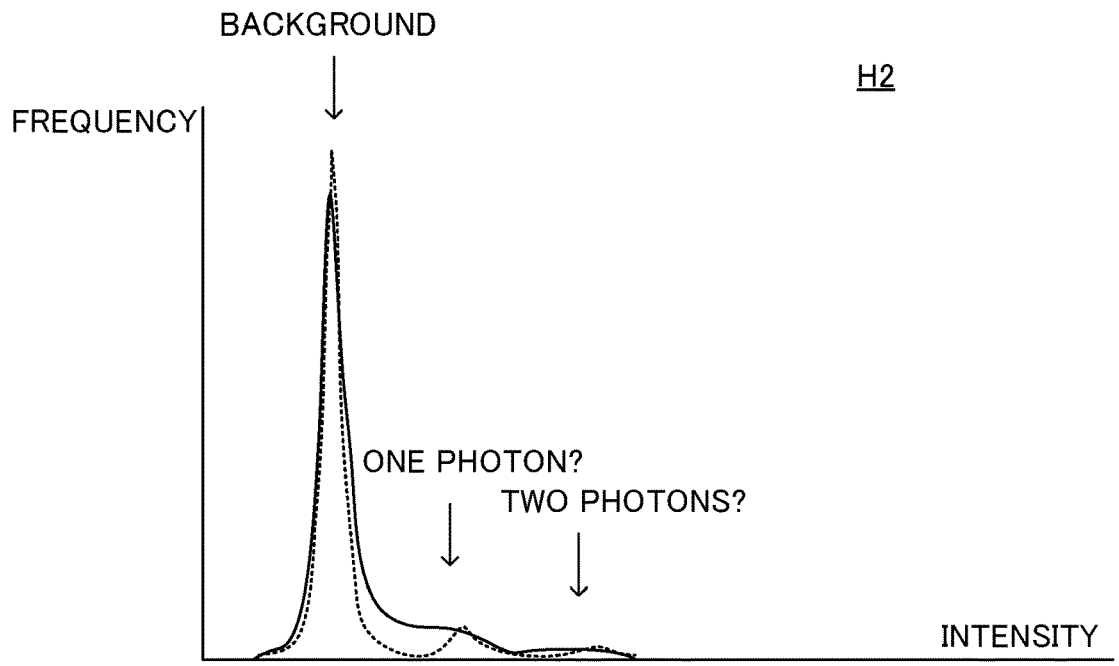
FIG. 15 is a diagram illustrating a comparison between histograms of a scanned image and an image obtained by smoothing processing.

FIG. 4 is an example of a flowchart of processing executed by the laser scanning microscope according to the present embodiment. FIG. 5 is an example of a flowchart of dark count noise estimation processing. FIG. 6 is an example of a flowchart of appearance frequency acquisition processing. FIG. 7 is a screen example related to SiPM setting. FIG. 8 is an example of a table including information regarding an appearance frequency of a dark count noise. FIG. 9 is another example of a table including information regarding an appearance frequency of a dark count noise. FIG. 10 is an example of a flowchart of appearance amount estimation processing. FIG. 11 is a screen example related to scan setting. FIG. 12 is an example of a flowchart of appearance position estimation processing. FIG. 13 is an example of a flowchart of dark count noise removal processing. FIG. 14 is a diagram illustrating a comparison between histograms of a scanned image and a corrected image. FIG. 15 is a diagram illustrating a comparison between histograms of a scanned image and an image obtained by smoothing processing.

Hereinafter, a specific example of image processing for removing dark count noise executed by the fluorescence microscope 100 at the time of generating a scanned image is described in detail with reference to FIGS. 4 to 15. Note that the processing of FIG. 4 is started by, for example, the processor 6a of the control device 6 executing the program stored in the memory 6b.

First, the fluorescence microscope 100 scans the sample A with laser light in response to an input of an instruction from the user, for example, by using the input device 4 and generates a scanned image of the sample A (Step S1). Here, the control device 6 constructs a scanned image based on the output signal from the photodetector 33 and a signal related to the scanning position of the scanner 17.

Thereafter, the fluorescence microscope 100 executes dark count noise estimation processing and dark count noise removal processing (Steps S2 and S3). This processing is executed by the control device 6. The control device 6 executes image processing including the dark count noise estimation processing and the dark count noise removal processing on the scanned image generated in step S1 to generate a corrected image in which the dark count noise is suppressed from the scanned image.

In the dark count noise estimation processing, as illustrated in FIG. 5, the control device 6 acquires the appearance frequency of the dark count noise in the appearance frequency acquisition processing (step S11), estimates the appearance amount of the dark count noise in the appearance amount estimation processing (step S12), and estimates the appearance position of the dark count noise in the appearance position estimation processing (step S13).

In the appearance frequency acquisition processing, as illustrated in FIG. 6, the control device 6 first specifies an individual of the SiPMs used to generate the scanned image in step S1 (step S21). The individual of the SiPMs used to generate the scanned image may be specified, for example, by referring to a channel setting region R1 of the setting screen as illustrated in FIG. 7. In this example, a channel "CH1" used to generate the scanned image indicates a photodetector "SiPM (A)". Therefore, the control device 6 specifies the photodetector "SiPM (A)" as the individual of the SiPMs used to generate the scanned image. Note that "SiPM (A)" is a SiPM included in the photodetector 33A illustrated in FIG. 1.

Next, the control device 6 first specifies the applied voltage to the SiPM used at the time of generating the scanned image in step S1 (step S22). The applied voltage to the SiPM may be specified, for example, by referring to the channel setting region R1 of the setting screen as illustrated in FIG. 7. In this example, since the applied voltage used to generate the scanned image is "5 V", the control device 6 specifies "5 V" as the applied voltage to the SiPM.

When the individual of the SiPMs and the applied voltage are specified, the control device 6 acquires the appearance frequency of the dark count noise in the SiPM (step S23). Here, the control device 6 refers to a table T1 illustrated in FIG. 8 storing the appearance frequency of the dark count noise for each individual of the SiPMs and each applied voltage stored in the memory 6b and acquires the appearance frequency corresponding to a combination of the individual "SiPM (A)" and the applied voltage "5 V" from the table T1. In this example, the control device 6 acquires "4.00" (times/msec) as the appearance frequency.

Note that the information stored in the table T1 illustrated in FIG. 8 is information measured in advance by an experiment or the like and can be generated, for example, by the following procedure. First, a status in which light is not incident on each SiPM of the fluorescence microscope 100 is assumed. Thereafter, an image is acquired with each setting of the applied voltages of 5 V and 8 V using these SiPMs which are thermostatic in 0° C. Then, the number of pixels in which dark count noise appears in these images is counted. The appearance frequency is calculated by dividing the number of pixels counted last by the total time of the photometric times of all the pixels configuring the image.

When acquiring the appearance frequency of the dark count noise, the control device 6 specifies the thermostatic temperature of the SiPM (step S24). When the thermostatic temperature of the SiPM is fixed at a specific temperature in the fluorescence microscope 100, a fixed value thereof is acquired. Furthermore, when the user can set the thermostatic temperature, the thermostatic temperature may be specified with reference to the information on the setting screen as in the case of specifying the individual and the applied voltage. In this example, the control device 6 acquires, for example, 0° C. as the thermostatic temperature.

When the thermostatic temperature is specified, the control device 6 acquires a correction coefficient of the appearance frequency (step S25). Here, the control device 6 refers to a table T2 illustrated in FIG. 9 storing the correction coefficient of the appearance frequency for each thermostatic temperature stored in the memory 6b and acquires the correction coefficient corresponding to the thermostatic temperature "0° C." from the table T2. In this example, the control device 6 acquires "1.00" as the correction coefficient.

Note that the information stored in the table T2 illustrated in FIG. 9 is information measured in advance by an experiment or the like and can be generated, for example, by the following procedure. The appearance frequency is calculated for each thermostatic temperature of the SiPM in the same procedure as in a case where the information stored in the table T1 illustrated in FIG. 8 is generated. The calculated appearance frequencies are grouped for each thermostatic temperature. Then, a correction coefficient corresponding to each group is calculated with reference to the group of the thermostatic temperature of 0° C. Specifically, the correction coefficient is calculated by dividing a representative value (such as an average value or a median value) of each group by the representative value of the group of the thermostatic temperature of 0° C.

The control device 6 corrects the appearance frequency acquired in step S23 with the correction coefficient acquired in step S25 (step S26). Here, the control device 6 calculates the appearance frequency of the dark count noise in the SiPM used to generate the scanned image by multiplying the appearance frequency "4.00" (times/msec) acquired in step S23 by the correction coefficient "1.00" acquired in step S25. As a result, an appearance frequency that does not depend on the intensity of the dark count noise is determined.

Finally, the control device 6 determines the appearance frequency of the dark count noise for each intensity (step S27) and ends the appearance frequency acquisition processing. Here, the control device 6 determines the appearance frequency of the dark count noise corresponding to the number of photons by using the Poisson distribution. In this example, the control device 6 determines the appearance frequency of the dark count noise corresponding to one photon as "3.96" (times/msec) and the appearance frequency of the dark count noise corresponding to two photons as "0.00797" (times/msec).

As illustrated in FIG. 10, in the appearance amount estimation processing executed subsequent to the appearance frequency acquisition processing, the control device 6 first specifies scan settings used to generate a scanned image (step S31). The scan setting used to generate the scanned image may be specified, for example, by referring to a scan setting region R2 on the setting screen as illustrated in FIG. 11. The scan setting may be any setting as long as the total time of the photometric times of all the pixels configuring the image can be known, and the scan setting may include scan speed (1 μsec/pixel), a scan size (512×512 pixels), and the like as illustrated in FIG. 11.

When the scan setting is specified, the control device 6 calculates the appearance amount of the dark count noise in the scanned image by the number of pixels based on the scan setting and the appearance frequency acquired in the appearance frequency acquisition processing (step S32) and ends the appearance amount estimation processing. Here, the control device 6 calculates the appearance amount of the dark count noise by the number of pixels for each intensity of the dark count noise corresponding to the number of photons. In this example, the control device 6 calculates the appearance amount of the dark count noise corresponding to one photon 1038 times, that is, as 1038 pixels in the scanned image by using the appearance frequency "3.96" (times/msec) and the total time of the photometric times in all the pixels configuring the image "1×512×512" (psec). Further, the control device 6 calculates the appearance amount of the dark count noise corresponding to two photons 2 times, that is, as 2 pixels in the scanned image by using the appearance frequency "0.00797" (times/msec) and the total time of the photometric times in all the pixels configuring the image "1×512×512" (μsec).

As illustrated in FIG. 12, in the appearance position estimation processing executed subsequent to the appearance amount estimation processing, the control device 6 first applies a smoothing filter to the scanned image (step S41) and generates a smoothed image. The smoothing processing corresponds to low-pass filter processing, and the smoothing filter is an example of a noise removal filter often used in the field of image processing. Specific examples of the smoothing filter include a median filter, an averaging filter, a Gaussian filter, and a recursive filter.

Next, the control device 6 takes a difference between the scanned image and the smoothed image to generate a noise image (step S42). Here, the control device 6 generates a noise image by subtracting the pixel value of the corresponding pixel of the smoothed image from the pixel value of each pixel of the scanned image. The smoothed image is an image mainly including a signal component from which dark count noise has been removed. Therefore, by subtracting the smoothed image from the scanned image, a noise image mainly including a noise component (dark count noise) can be generated.

Finally, the control device 6 specifies the pixel position where the noise appears based on the noise image and the noise amount estimated by the appearance amount estimation processing (step S43) and ends the appearance position estimation processing. Here, the control device 6 selects pixels in descending order of pixel values included in the noise image by the number of pixels calculated as the noise amount and specifies the position of the selected pixel as the pixel position where the dark count noise appears. In this example, the control device 6 specifies the top two pixels of the pixel value included in the noise image as the pixel positions where the dark count noise corresponding to two photons appears and specifies the top 1038 pixels of the pixel value among the remaining pixels included in the noise image as the pixel positions where the dark count noise corresponding to one photon appears.

When the dark count noise estimation processing including the appearance frequency acquisition processing, the appearance amount estimation processing, and the appearance position estimation processing ends, the control device 6 executes the dark count noise removal processing (step S3).

As illustrated in FIG. 13, in the dark count noise removal processing, the control device 6 repeats the processing of removing the dark count noise for each number of photons from the scanned image (steps S51 to S53). In this example, the control device 6 first subtracts the pixel value corresponding to the dark count noise for two photons from the pixel value at the pixel position where the dark count noise for two photons appears specified in the appearance position estimation processing in the scanned image. For example, if the pixel value corresponding to the dark count noise for one photon is 16, the pixel value corresponding to the dark count noise for two photons is 32. Thereafter, the control device 6 subtracts the pixel value corresponding to the dark count noise for one photon from the pixel value at the pixel position where the dark count noise for one photon appears specified in the appearance position estimation processing in the scanned image. As a result, a corrected image in which the dark count noise is removed from the scanned image is generated.

Finally, the control device 6 outputs the corrected image (step S54) and ends the processing illustrated in FIG. 4. Here, the control device 6 may output the corrected image to the memory 6b in order to store the corrected image in the memory 6b or may output the corrected image to the display device 5 in order to display the corrected image on the display device 5.

As described above, by executing the processing of FIG. 3, the fluorescence microscope 100 can remove the dark count noise from the scanned image by the statistically calculated noise amount. Therefore, it is possible to avoid excessive removal of dark count noise and excessive remaining of noise due to insufficient removal. Furthermore, dark count noise can be removed while maintaining image characteristics suitable for photon counting of the scanned image. This point is described with reference to FIGS. 14 and 15.

In FIG. 14, the histogram of the pixel value (intensity) included in the scanned image is drawn by a broken line, and the histogram of the pixel value (intensity) included in the corrected image is drawn by a solid line. In addition, in FIG. 15, the histogram of the pixel value (intensity) included in the scanned image is drawn by a broken line, and the histogram of the pixel value (intensity) included in the smoothed image is drawn by a solid line.

Due to the characteristic of outputting a signal having an intensity proportional to the number of incident photons of the SiPM, in the histogram of the scanned image, as illustrated by the broken lines in FIGS. 14 and 15, a mountain including a peak indicating the background, a mountain including a peak indicating one photon, and a mountain including a peak indicating two photons can be detected in a clearly distinguished manner Therefore, the number of photons can be quantitatively counted.

In the above-described image processing on the scanned image, the dark count noise is removed by subtracting a value corresponding to the distance between the mountains of the histogram (a value for one photon, a value for two photons, and the like) from the pixel value of the pixel in which the dark count noise appears included in the scanned image. This processing corresponds to movement from a mountain of one photon or a mountain of two photons to a mountain of background on the histogram. Therefore, as indicated by the solid line in FIG. 14, even in the histogram of the corrected image obtained by the image processing described above, the mountain including the peak indicating the background, the mountain including the peak indicating one photon, and the mountain including the peak indicating two photons are maintained and can be detected in a clearly distinguished manner.

On the other hand, since the smoothing processing has an action of crushing the mountains of the histogram to widen the field, as illustrated by the solid line in FIG. 15, in the histogram of the smoothed image, the boundaries between the mountain including the peak indicating the background, the mountain including the peak indicating one photon, and the mountain including the peak indicating two photons become ambiguous, and the pixel corresponding to the background, the pixel corresponding to one photon, and the pixel corresponding to two photons cannot be distinguished.

As described above, in the fluorescence microscope 100, it is possible to maintain image characteristics suitable for photon counting which is difficult to realize simultaneously with noise removal in the related art. Therefore, with the fluorescence microscope 100, by using the corrected image in which dark count noise is suppressed, photons can be more accurately counted.

Second Embodiment

A laser scanning microscope according to the present embodiment has the same configuration as the fluorescence microscope 100 illustrated in FIG. 1. Therefore, the components of the laser scanning microscope according to the present embodiment are referred to by the same reference numerals as the components of the fluorescence microscope 100.

Figure 16:
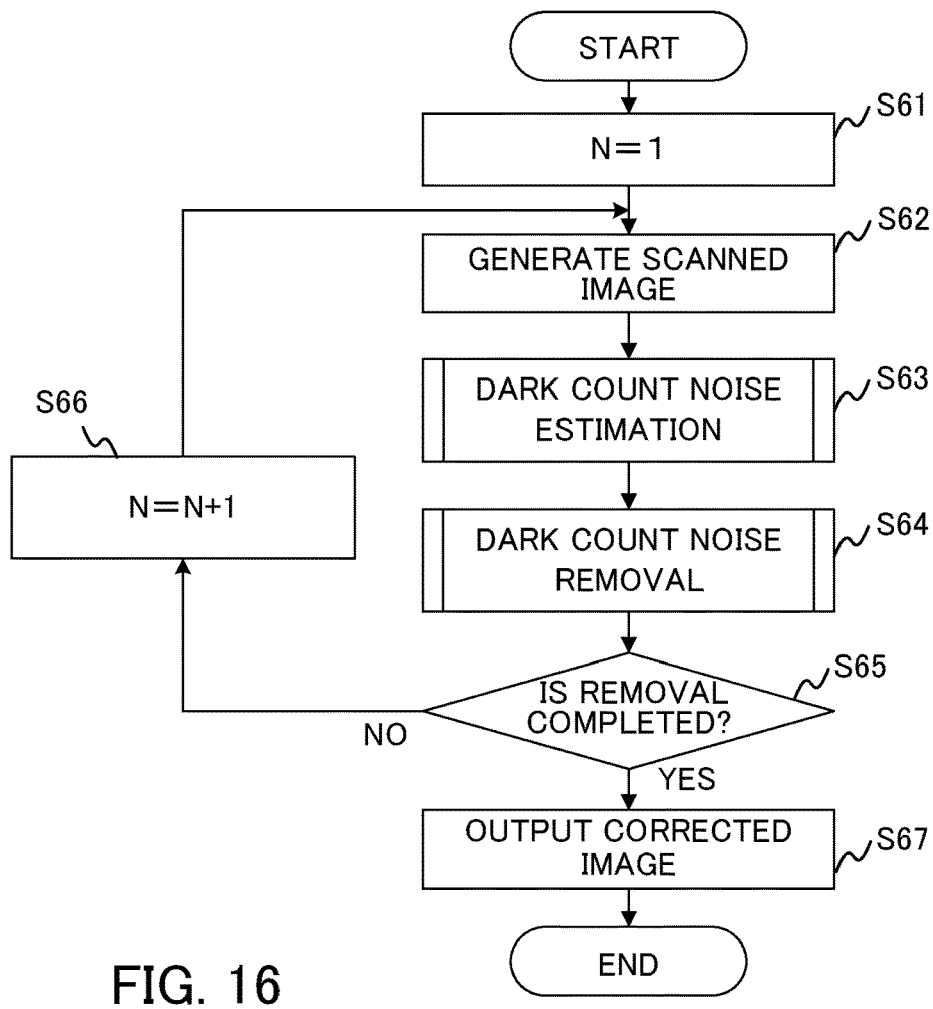
FIG. 16 is an example of a flowchart of processing executed by a laser scanning microscope according to a second embodiment.

FIG. 16 is an example of a flowchart of processing executed by the laser scanning microscope according to the present embodiment. The laser scanning microscope according to the present embodiment is different from the fluorescence microscope 100 in that the processing illustrated in FIG. 16 is executed instead of the processing illustrated in FIG. 4. Hereinafter, a specific example of image processing for removing dark count noise executed by the laser scanning microscope according to the present embodiment at the time of generating a scanned image is described with reference to FIG. 16. Similarly to the processing of FIG. 4, the processing of FIG. 16 is also started by, for example, the processor 6a of the control device 6 executing a program stored in the memory 6b.

The processing illustrated in FIG. 16 is different from the processing illustrated in FIG. 4 in that the generation of the scanned image, the estimation of the dark count noise, and the removal of the dark count noise are performed for each number of photons corresponding to the dark count noise. The laser scanning microscope focuses on photons in ascending order of the number of photons. Specifically, the laser scanning microscope first initializes N indicating the number of focusing photons to N=1 (step S61). Thereafter, the laser scanning microscope repeats the scanned image generation processing, the dark count noise estimation processing, and the dark count noise removal processing by the number of photons corresponding to the maximum intensity of the dark count noise included in the scanned image while incrementing the number of focusing photons one by one per repetition (steps S62 to S66).

The processing of step S62 is similar to the processing of step S1 in FIG. 4. The dark count noise estimation processing in step S63 is different from the dark count noise estimation processing illustrated in FIG. 4 in that a noise image is generated by using a learned model constructed by machine learning instead of the smoothing filter.

Specifically, the control device 6 generates a spatial distribution of a generation probability of the dark count noise in the scanned image as a noise image based on a learned model that learns a relationship between an image to which dark count noise is added and spatial distribution of the dark count noise added to the image and the scanned image. That is, the noise image is a probability image, and the pixel value of the noise image indicates a probability that the pixel includes dark count noise. Note that the probability can be continuously expressed by expressing the pixel value of the noise image with a real number, so that the accuracy of specifying the pixel position where the dark count noise described below appears is improved.

Note that the learned model used to generate the noise image can be constructed, for example, by the following procedure. First, an image in which dark count noise is artificially added to an original image having no dark count noise and an image including only the added dark count noise are generated. Such image sets are generated while changing the original image, the pattern of the dark count noise to be added (spatial intensity distribution), the appearance frequency of the dark count noise to be added, and the like. Then, by performing machine learning on the relationship between the image to which the dark count noise is added and the spatial distribution of the dark count noise added to the image by using all the image sets, a learned model for generating an image of only the dark count noise from the image to which the dark count noise is added is constructed.

The method of specifying the pixel position where the dark count noise appears from the noise image and the method of removing the noise from the scanned image are basically similar to those in the first embodiment. Specifically, the control device 6 selects pixels in descending order of pixel values (appearance probability) included in the noise image by the number of pixels calculated as the noise amount and specifies the position of the selected pixel as the pixel position where the dark count noise appears. Then, a value corresponding to the dark count noise is subtracted from the pixel value at the specified pixel position of the image (for example, the scanned image) including the dark count noise.

However, in the present embodiment, the dark count noise corresponding to one photon is removed in the first repetition, and the dark count noise corresponding to two photons is removed in the second repetition. This is repeated by the number of photons corresponding to the maximum intensity of the dark count noise. More specifically, in the first repetition, the pixel position where the dark count noise appears is specified from the noise image by the total noise amount (the number of pixels including the dark count noise) included in the scanned image, and the value corresponding to the dark count noise of one photon is subtracted from the pixel value of the specified pixel position of the scanned image. As a result, the pixel value is adjusted by the value corresponding to one photon for all the pixels including the dark count noise of the scanned image.

Thereafter, an image generated by removing the dark count noise corresponding to one photon from the scanned image (referred to as an updated image) is input to the above-described learned model, and a noise image is generated again. Then, in the second repetition, the pixel position where the dark count noise appears is specified from the newly generated noise image by the noise amount (the number of pixels) obtained by removing the noise amount (the number of pixels) of the dark count noise for one photon from the total noise amount (the number of pixels including the dark count noise) included in the scanned image, and the pixel value at the specified pixel position of the updated image is further subtracted by a value corresponding to the dark count noise for one photon. As a result, for all the pixels including the dark count noise of two or more photons of the scanned image, the pixel value is further adjusted by the value corresponding to one photon, and the pixel value is adjusted by a value corresponding to two photons in total.

When the maximum intensity of the dark count noise included in the scanned image is for two photons, the processing may be repeated 2 times as described above. If the maximum intensity of the dark count noise included in the scanned image is for three photons, the processing may be repeated three times, and if the maximum intensity is for four photons, the processing may be repeated four times.

Also with the laser scanning microscope according to the present embodiment, similarly to the fluorescence microscope 100 according to the first embodiment, dark count noise can be removed, and accurate photon counting can be performed by using a corrected image in which the dark count noise is suppressed.

The above-described embodiments are specific examples to facilitate an understanding of the invention, and hence the present invention is not limited to such embodiments. Modifications obtained by modifying the above-described embodiments and alternatives to the above-described embodiments may also be included. In other words, the constituent elements of each embodiment can be modified without departing from the spirit and scope of the embodiment. Moreover, new embodiments can be implemented by appropriately combining a plurality of constituent elements disclosed in one or more of the embodiments. Furthermore, some constituent elements may be omitted from the constituent elements in each embodiment, or some constituent elements may be added to the constituent elements in each embodiment. Further, the order of the processing procedure disclosed in each embodiment may be changed as long as no contradiction results. That is, the laser scanning microscope, the image processing apparatus, and the method of operating the laser scanning microscope of the present invention can be variously modified and changed without departing from the scope of the invention defined by the claims.

As illustrated in FIGS. 8 and 9, in the above-described embodiment, an example is described in which the memory 6b stores the appearance frequency for each combination of an individual of the SiPMs and the applied voltage and further stores the correction coefficient for each thermostatic temperature. However, this information regarding the appearance frequency may be stored in the memory 6b in another format. For example, the appearance frequency may be stored for each combination of an individual of the SiPM, an applied voltage, and a thermostatic temperature. That is, the structure of the table is not limited to the two-dimensional structure and may have a three or higher-dimensional structure.

In the above-described embodiment, the example in which the appearance frequency is stored for each combination of the individual of the SiPMs and the applied voltage is described. However, when the change in the appearance frequency depending on the applied voltage is substantially constant regardless of the individual of the SiPMs and the electric circuit, the change in the appearance frequency depending on the applied voltage may be managed as the correction coefficient. In that case, the appearance frequency may be only managed for each SiPM.

In addition, in the same type of SiPM, when a difference in appearance frequency due to individual differences is negligibly small, the memory 6b may store the appearance frequency for each type instead of each individual of SiPMs. In addition, when there is almost no individual difference or type difference in the appearance frequency, the memory 6b may store the appearance frequency as a single fixed value.

In addition, when the appearance frequency corresponding to the used setting is not stored in the memory 6b, the appearance frequency corresponding to the used setting may be calculated by interpolating the appearance frequency of another setting. For example, when the appearance frequency corresponding to the applied voltage to be used is not stored in the table stored in the memory 6b, the appearance frequency corresponding to the applied voltage to be used may be calculated by interpolation from the appearance frequencies corresponding to different applied voltages.

In addition, the memory 6b may store a function or a parameter for calculating the appearance frequency as information related to the appearance frequency instead of storing the appearance frequency itself in a table format (table format) as illustrated in FIGS. 8 and 9. For example, the number of APDs configuring the SiPM and the appearance frequency of the dark count noise per APD may be stored as parameters, and the appearance frequency of the dark count noise in the SiPM may be calculated using these parameters.

In the above-described embodiment, the example in which the SiPM setting and the scan setting are acquired from the current setting of the fluorescence microscope 100 has been described. However, this information may be stored together with the scanned image, and image processing for removing dark count noise may be executed by using this information stored together with the scanned image. In this case, the image processing is not necessarily executed at the time of generating the scanned image, and may be executed at an arbitrary timing with respect to the scanned image.

Furthermore, the execution subject of the image processing may be a device different from the control device that generates the scanned image. Image processing for removing dark count noise from the scanned image may be performed by image processing apparatus different from the control device, and the image processing apparatus may be an external device not included in the laser scanning microscope.

In the above-described embodiment, an example is described in which the information related to the appearance frequency is read from the memory 6b of the control device 6. However, the information related to the appearance frequency may be stored in a device different from the control device included in the laser scanning microscope, for example, a server device placed in a cloud. The laser scanning microscope may acquire information related to the appearance frequency from the server device placed in the cloud to remove dark count noise from the scanned image.

Figure 17:
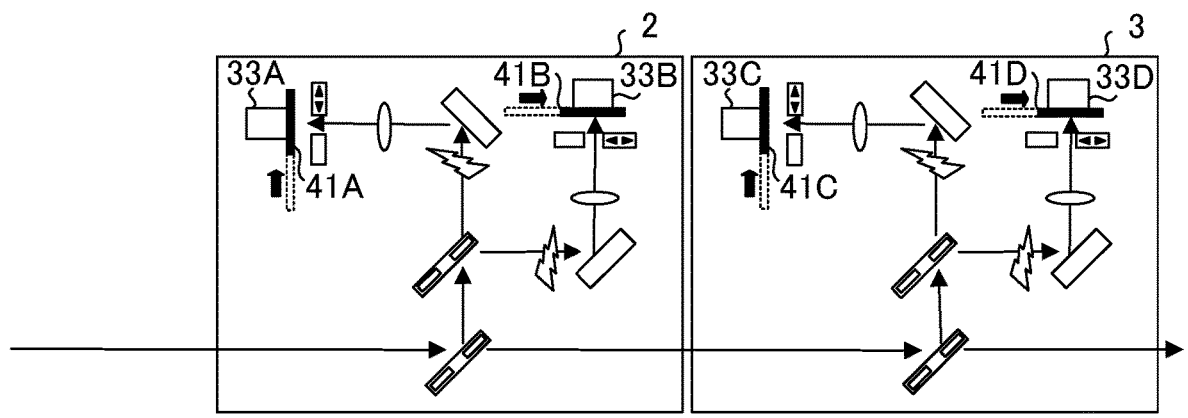
FIG. 17 is a diagram illustrating a modification of the laser scanning microscope.

In the above-described embodiment, an example is described in which the information related to the appearance frequency stored in advance is read and used for image processing. However, the information related to the appearance frequency may be generated at a necessary timing. For example, as illustrated in FIG. 17, blocking portions (a light shielding portion 41A, a light shielding portion 41B, a light shielding portion 41C, a light shielding portion 41D) that block incidence of light on the SiPM of the photodetector 33 may be provided in the first detection unit 2 and the second detection unit 3. The control device 6 may generate the information related to the generation frequency based on another scanned image generated with the same setting of the SiPM as when the scanned image to be subjected to the image processing is generated in a state where the blocking portions block the incidence of light on the SiPM. By removing the offset component and the like from the scanned image acquired under such conditions, an image including only the dark count noise component can be obtained. By converting the luminance value of the image including only the dark count noise component into the number of photons, it is possible to specify the number of pixels including the dark count noise and for which number of photons the dark count noise is included in each pixel. The generation frequency used for the image processing may be specified from this information.

In the present specification, the expression "based on A" does not indicate "based on only A" but indicates "based on at least A" and further indicates "based partially on at least A". That is, "based on A" may indicate "based on B in addition to A" or "based on a part of A".

What is claimed is:

1. A laser scanning microscope comprising:
   a scanner that scans a sample with laser light;
   a detector having a silicon photomultiplier (SiPM); and
   a processor that executes image processing of removing dark count noise based on an appearance frequency of the dark count noise in the SiPM on a scanned image that is obtained by scanning the sample by the scanner and is generated based on a signal output from the detector,
   wherein:
   the processor estimates an amount of the dark count noise included in the scanned image as a noise amount based on the appearance frequency of the dark count noise in the SiPM and a setting of the laser scanning microscope, and removes the dark count noise from the scanned image in accordance with the estimated noise amount,
   the setting of the laser scanning microscope includes a setting of the SiPM and a scan setting of the laser scanning microscope, and
   the processor acquires information related to the appearance frequency of the dark count noise in the SiPM based on the setting of the SiPM, and statistically calculates the noise amount based on the appearance frequency of the dark count noise specified from the acquired information and the scan setting.

2. The laser scanning microscope according to claim 1, wherein the processor calculates a number of pixels including the dark count noise included in the scanned image as the noise amount, and subtracts a predetermined value from pixel values of the number of pixels of the scanned image.

3. The laser scanning microscope according to claim 1, wherein the processor statistically calculates the noise amount for each intensity based on the appearance frequency for each intensity of the dark count noise specified from the acquired information and the scan setting.

4. The laser scanning microscope according to claim 3, wherein the processor calculates a number of pixels including the dark count noise included in the scanned image as the noise amount per intensity, and subtracts a value according to the intensity from pixel values of the number of pixels calculated per intensity of the scanned image.

5. A laser scanning microscope comprising:
   a scanner that scans a sample with laser light;
   a detector having a silicon photomultiplier (SiPM); and a processor that executes image processing of removing dark count noise based on an appearance frequency of the dark count noise in the SiPM on a scanned image that is obtained by scanning the sample by the scanner and is generated based on a signal output from the detector, wherein:

the processor estimates an appearance position of the dark count noise on the scanned image based on the scanned image and the estimated noise amount, and removes the dark count noise from the estimated appearance position on the scanned image by the estimated noise amount, and the processor further generates a noise image including a score related to the dark count noise included in each pixel of the scanned image based on the scanned image, and determines the appearance position based on the noise image and the estimated noise amount.

6. The laser scanning microscope according to claim 5, wherein the processor generates the noise image based on a difference between the scanned image and an image obtained by applying a noise removal filter to the scanned image.

7. The laser scanning microscope according to claim 5, wherein the processor generates a spatial distribution of an appearance probability of the dark count noise included in the scanned image as the noise image based on the scanned image and a learned model that learns a relationship between an image to which the dark count noise is added and a spatial intensity distribution of the dark count noise added to the image.

8. A laser scanning microscope comprising:

a scanner that scans a sample with laser light;

a detector having a silicon photomultiplier (SiPM);

a processor that executes image processing of removing dark count noise based on an appearance frequency of the dark count noise in the SiPM on a scanned image that is obtained by scanning the sample by the scanner and is generated based on a signal output from the detector; and a memory that stores information related to the appearance frequency of the dark count noise in the SiPM, wherein:

the memory stores the information related to the appearance frequency of the dark count noise for each individual one of SiPMs included in the detector, and the processor specifies the appearance frequency from the information that corresponds to the individual one of the SiPMs used to generate the scanned image and is acquired from the memory.

9. A laser scanning microscope comprising:

a scanner that scans a sample with laser light;

a detector having a silicon photomultiplier (SiPM);

a processor that executes image processing of removing dark count noise based on an appearance frequency of the dark count noise in the SiPM on a scanned image that is obtained by scanning the sample by the scanner and is generated based on a signal output from the detector; and a memory that stores information related to the appearance frequency of the dark count noise in the SiPM, wherein:

the memory stores the information related to the appearance frequency of the dark count noise for each setting of the SiPM, and the processor specifies the appearance frequency from the information that corresponds to the setting of the SiPM used to generate the scanned image and is acquired from the memory.

10. The laser scanning microscope according to claim 9, wherein the setting of the SiPM includes a setting related to an applied voltage to the SiPM.

11. The laser scanning microscope according to claim 9, wherein the setting of the SiPM includes a setting related to temperature at which the SiPM is thermostatic.

12. A laser scanning microscope comprising:

a scanner that scans a sample with laser light;

a detector having a silicon photomultiplier (SiPM);

a processor that executes image processing of removing dark count noise based on an appearance frequency of the dark count noise in the SiPM on a scanned image that is obtained by scanning the sample by the scanner and is generated based on a signal output from the detector; and a blocking portion that blocks incidence of light on the SiPM, wherein the processor specifies the appearance frequency based on an image generated with the same setting of the SiPM as when the scanned image is generated in a state where the blocking portion blocks the incidence of light on the SiPM.

13. The laser scanning microscope according to claim 1, wherein the processor further outputs a corrected image generated by executing the image processing on the scanned image to a display device.

14. The laser scanning microscope according to claim 2, wherein the processor estimates an appearance position of the dark count noise on the scanned image based on the scanned image and the estimated noise amount, and removes the dark count noise from the estimated appearance position on the scanned image by the estimated noise amount.

15. An image processing apparatus comprising:

a processor, wherein:

the processor executes image processing of removing dark count noise based on an appearance frequency of the dark count noise in a silicon photomultiplier (SiPM) included in a laser scanning microscope on a scanned image that is obtained by scanning a sample by a scanner in the laser scanning microscope and is generated based on a signal output from a detector having the SiPM, the processor estimates an amount of the dark count noise included in the scanned image as a noise amount based on the appearance frequency of the dark count noise in the SiPM and a setting of the laser scanning microscope, and removes the dark count noise from the scanned image in accordance with the estimated noise amount, the setting of the laser scanning microscope includes a setting of the SiPM and a scan setting of the laser scanning microscope, and the processor acquires information related to the appearance frequency of the dark count noise in the SiPM based on the setting of the SiPM, and statistically calculates the noise amount based on the appearance frequency of the dark count noise specified from the acquired information and the scan setting.

16. A method of operating a laser scanning microscope, the method comprising:

generating a scanned image that is obtained by scanning a sample by a scanner included in the laser scanning microscope based on a signal output from a detector having a silicon photomultiplier (SiPM) included in the laser scanning microscope; and executing image processing of removing dark count noise based on an appearance frequency of the dark count noise in the SiPM on the scanned image, wherein:

the executing the image processing comprises estimating an amount of the dark count noise included in the scanned image as a noise amount based on the appearance frequency of the dark count noise in the SiPM and a setting of the laser scanning microscope, and removing the dark count noise from the scanned image in accordance with the estimated noise amount, the setting of the laser scanning microscope includes a setting of the SiPM and a scan setting of the laser scanning microscope, and the executing the image processing comprises acquiring information related to the appearance frequency of the dark count noise in the SiPM based on the setting of the SiPM, and statistically calculating the noise amount based on the appearance frequency of the dark count noise specified from the acquired information and the scan setting.

\* \* \* \* \*